March 29, 1960 S. I. MacDUFF 2,930,359
POWER STEERING MECHANISM
Filed Jan. 7, 1958 2 Sheets-Sheet 1

INVENTOR.
STANLEY I. MacDUFF
BY
William N. Antonis
ATTORNEY.

March 29, 1960  S. I. MacDUFF  2,930,359
POWER STEERING MECHANISM
Filed Jan. 7, 1958  2 Sheets-Sheet 2
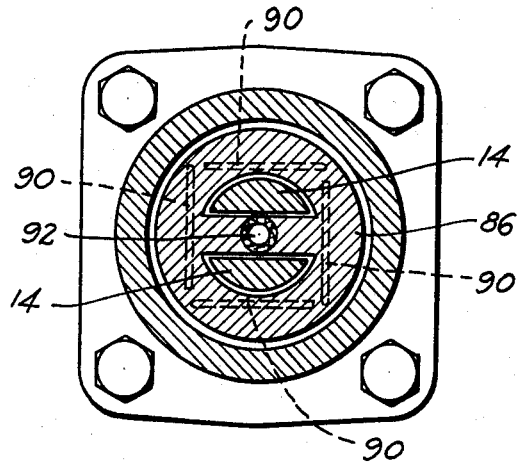
FIG_2
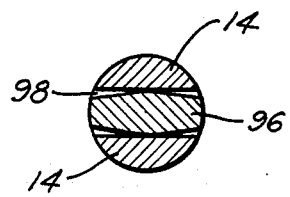
FIG_3
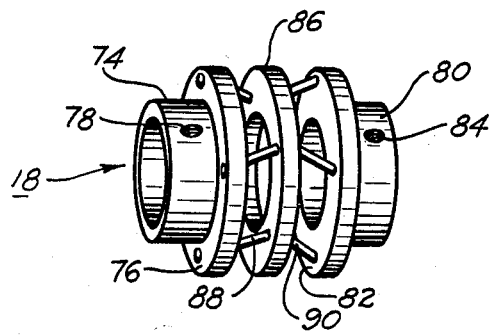
FIG_4
INVENTOR.
STANLEY I. MAC DUFF.
BY
William N. Antonio
ATTORNEY.

United States Patent Office 2,930,359
Patented Mar. 29, 1960

2,930,359

POWER STEERING MECHANISM

Stanley I. MacDuff, South Bend, Ind., assignor to Bendix Aviation Corporation, South Bend, Ind., a corporation of Delaware Application January 7, 1958, Serial No. 707,592

6 Claims. (Cl. 121—41)

The present invention relates to power steering and more particularly to improvements in a combination valve actuating and "feel" transmitting mechanism of the type disclosed in H. E. Hruska's application No. 701,644.

A primary object of this invention is to provide a functionally improved combination valve actuating and "feel" transmitting mechanism which can be more easily assembled and more economically fabricated than comparable actuators.

An important object of this invention is to provide a power steering actuating mechanism for transmitting "feel" to the driver and simultaneously actuating the power steering control valve, wherein the structural arrangement is such that no lost motion results due to mechanical clearances therein, thereby permitting more positive and accurate power steering response upon rotation of the steering wheel.

More specifically, it is an object of this invention to provide a power steering valve actuating means located between the steering gear and the steering wheel wherein said actuating member is rigidly connected to the upper shaft section of the steering column by one set of angularly disposed spring struts and to the lower shaft section of the steering column by a similar second set of angularly disposed spring struts, so that said actuating member does not contact said shaft sections and is freely movable with respect thereto, said two sets of spring struts serving as the sole connecting means, while simultaneously transmitting "feel" and causing movement of said actuating member upon manual rotation of the upper shaft section of the steering column.

The above and other objects and features of the invention will become apparent from the following description of the mechanism taken in connection with the accompanying drawings which form a part of this specification and in which:

Figure 2 is a sectional view taken along line 2—2 of Figure 1;

Figure 3 is a sectional view taken along line 3—3 of Figure 1; and

Figure 4 is a perspective view of a portion of the present invention.

Figure 1:
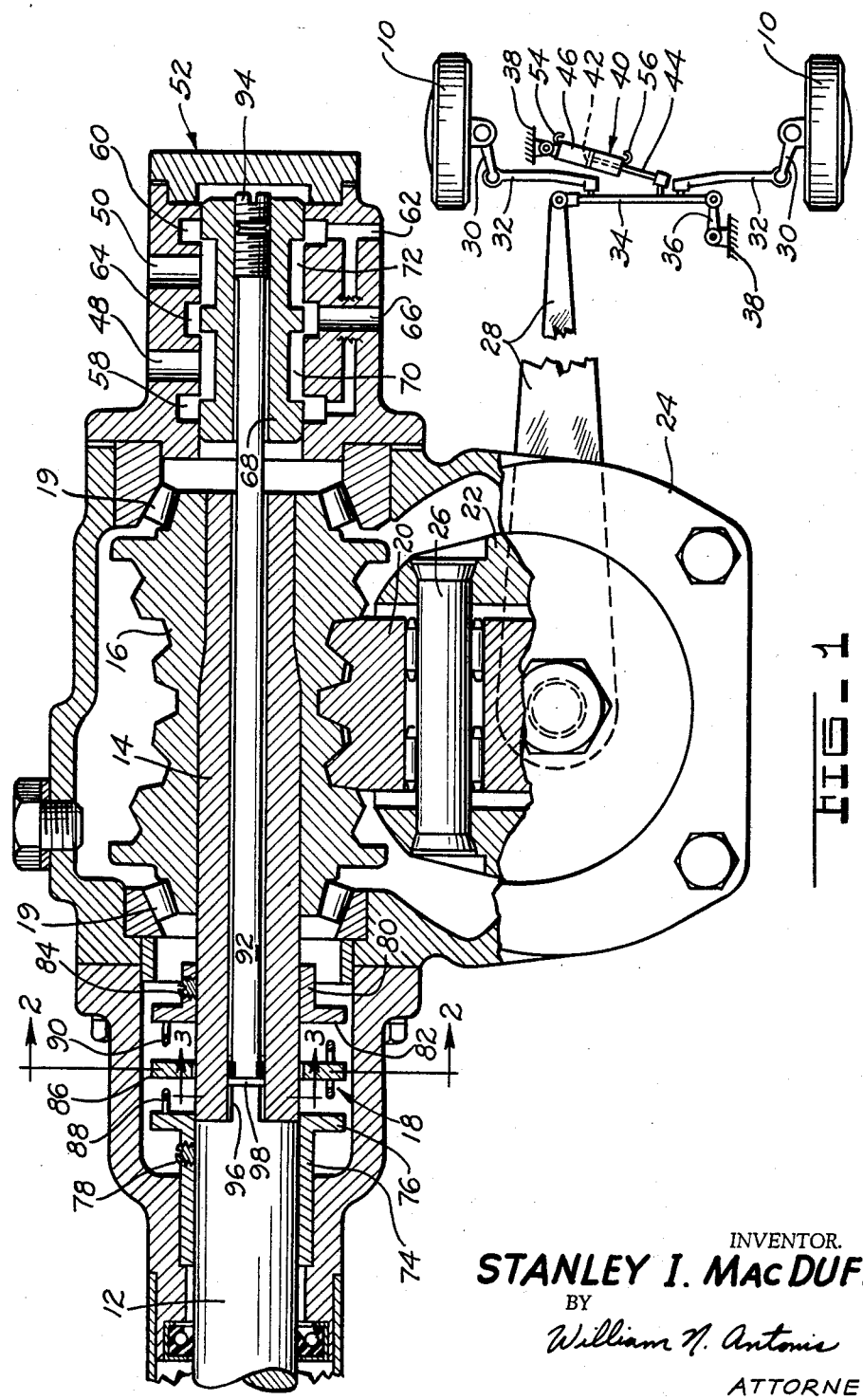
Figure 1 is a sectional view of a power steering unit, constructed in accordance with the present invention, which is shown in association with parts of a vehicle drawn schematically.

Referring to Figure 1, the reference numeral 10 designates the front wheels of a vehicle to be steered by rotation of a steering wheel (not shown) which is connected to steering shaft 12. A shaft section 14, having a worm gear 16 of the hour glass type mounted on the end thereof, is drivably connected to the steering shaft 12 by means of a control assembly indicated generally by the numeral 18. The shaft section 14 is held against axial displacement by thrust bearings 19 located at each end of the worm. A roller sector gear 20 is arranged in meshing relationship with the worm gear and is carried by one end of a rock shaft 22 which is properly journaled in housing 24. The roller sector gear 20 is rotatably carried on a pivot pin 26 suitably supported at one end of the rock shaft 22. A pitman arm 28 is connected to the rock shaft 22 and to the spindle arms 30 of the wheels 10 through a steering linkage assembly which includes tie rods 32, a cross tie rod 34, and an idler arm 36 suitably pivoted at one end to the vehicle frame 38.

The hydraulic system of the steering gear includes a fluid motor 40 which is connected between the cross tie rod 34 and the vehicle frame 38. The fluid motor includes a piston 42, a piston rod 44 suitably attached to the cross tie rod 34, and a cylinder 46 connected to the vehicle frame 38. The piston 42 divides the cylinder 46 into opposed chambers constantly communicating respectively with cylinder ports 48 and 50 of a valve 52, via conduits 54 and 56. The valve, which is of conventional construction, is suitably attached to the end of the gear housing and includes two annular grooves 58 and 60 in the valve body, which communicate with a reservoir (not shown) via return port 62, and a third annular groove 64 intermediate grooves 58 and 60, which communicates with a pump (not shown) via inlet port 66. The valve spool 68 is provided with two annular grooves 70 and 72, which communicate with cylinder ports 48 and 50 respectively, and which overlap the grooves in the valve body to provide open passages through the valve when the spool is in neutral position.

Referring to Figures 1 and 4, it can be seen that valve actuation is provided through means of the control assembly 18, which includes a sleeve 74 having a flange 76, said sleeve being rigidly connected to steering shaft 12 by means such as set screw 78, and a sleeve 80 having a flange 82, said latter sleeve being rigidly connected to shaft section 14 by means such as set screw 84. A washer like member 86, which surrounds shaft section 14 but does not make contact therewith, is located between flanges 76 and 82 and is axially movable with respect to shafts 12 and 14. A first set of evenly distributed spring struts 88, each having one end rigidly connected to flange 76 and the other end to washer 86, is angularly positioned with respect to the faces of the flange and washer. The evenly distributed spring struts 90, which constitute a second set, have their ends rigidly connected to the washer 86 and to the flange 82. This second set of struts 90 is angularly positioned at the same angle as the first set of struts 88, but it should be noted that these struts extend in an angular direction opposite to that of the first set of struts. Referring to Figures 1 and 2, it will be seen that washer 86 is riveted or welded to the end of actuating rod 92, which is in turn is threaded onto the valve spool 68. A lock set screw 94 is utilized to lock the spool in its proper position. Limited relative movement between steering shaft 12 and shaft section 14 is provided by a tongue and groove arrangement, as shown in the sectional view of Figure 3, wherein the tongue 96 is formed on the end of steering shaft 12 and the tongue groove 98 is formed on the end of shaft section 14.

The operation of this steering mechanism is as follows: upon initial turning of steering shaft 12, a certain amount of steering force is transmitted directly to shaft section 14 through the two sets of struts 88 and 90 of control assembly 18. These struts, which begin deflecting upon any slight initial rotational movement of steering shaft 12, are capable of transmitting rotational forces from the steering shaft 12 to shaft section 14 in proportion to the degree of their deflection or deformation. Any amount of deformation of the struts will result in immediate axial movement of washer member 86 and consequent movement of spool 68, since it is connected to the washer via rod 92, but no power boost will result until axial movement of the washer 86 has moved the valve spool to a cut off position which will result in increased pressurization of one or the other of the power cylinder chambers. Thus rotation of the steering shaft in a counter-clockwise direction (looking at Figures 1 and 4 from the left) will cause the washer member 86 to move to the right thereby also moving valve spool 68 to the right, since they are connected to each other by rod 92. Such movement is due to the fact that rotation of the steering shaft in this counter-clockwise direction tends to increase the acute angles formed by spring struts 88 and decrease the acute angles formed by spring struts 90, thereby in effect causing spring struts 88 to push the washer 86 away from flange 76 and spring struts 90 to pull the washer 86 towards flange 82. Rotation of the steering shaft in a clockwise direction will cause washer member 86 and valve spool 68 to move to the left, this movement being due to the reverse flexing of struts 88 and 90, wherein the acute angles formed by struts 88 tend to decrease and the acute angles formed by struts 90 tend to increase. Thus, in the latter instance the spring struts 88 pull the washer 86 towards flange 76 and spring struts 90 push the washer 86 away from flange 82. After the torque applied to steering shaft 12 is released, the springs 88 and 90 will return the valve spool 68 to its neutral position. In the event of power failure manual steering is provided by means of the tapered tongue and groove arrangement. Thus, once the opposed tapered faces of tongue 96 make contact with the walls of the groove 98, manual steering will be possible.

By using two sets of angularly positioned spring struts 88 and 90, in the manner disclosed, it is possible, just as in Hruska's application Serial No. 701,644, to achieve a direct actuation of the power steering control valve through rotation of the steering shaft while simultaneously providing a more accurate "feel" of the road. However, my structural arrangement has certain further advantages. First of all the arrangement lends itself to relatively easy assembling operations and, overall, to more economical fabrication. The actuator arrangement eliminates all frictional resistance to the actuating member (washer 86) with the steering shaft, since the actuating member is spaced from the shaft through means of the two sets of struts, which rigidly hold the member in position. Thus, any possibility of binding between the actuating member and the shaft is also eliminated. Furthermore, the fact, that the actuating member is rigidly held in place by the struts, eliminates any possible lost motion in the actuating mechanism itself. Such lost motion might result from mechanical clearances which could be obviated only by relatively expensive precision machining and assembling of the actuator parts.

Although this invention has been described in connection with a specific embodiment, the principles are susceptible of numerous other applications that will readily occur to persons skilled in the art.

Having thus described the various features of this invention what I claim as new and desire to secure by Letters Patent is:

1. In a power steering mechanism having a power cylinder and a valve for controlling the operation of said power cylinder, a valve actuating mechanism comprising an operating shaft, a driven shaft, a member axially movable with respect to said shafts and connected to said valve, first resilient means connected to said operating shaft and to said member, and second resilient means connected to said member and to said driven shaft, said first and second resilient means simultaneously opposing rotation of said operating shaft and causing axial movement of said member in one direction upon clockwise rotation of said operating shaft and in the opposite direction upon counter-clockwise rotation of said operating shaft.

2. In a servomotor, driven means, a hydraulic ram drivingly connected to said driven means, a valve for controlling the operation of said ram, an operating shaft, a driven shaft coaxial with said operating shaft and connected to said driven means, a lost motion connection between said operating shaft and said driven shaft, a first member rigidly connected to one of said shafts, a second member rigidly connected to the other of said shafts, a third member axially movable with respect to said shafts, first resilient deformable means connected to said first and third members, and second resilient deformable means connected to said second and third members, said first and second resilient deformable means simultaneously opposing rotation of said operating shaft and causing axial movement of said third member in one direction upon clockwise rotation of said operating shaft and in the opposite direction upon counter-clockwise rotation of said operating shaft.

3. A power steering mechanism comprising steering means, a steering shaft, a driven shaft coaxial with said steering shaft and connected to said steering means, means between said steering shaft and said driven shaft for permitting limited relative rotary motion therebetween, actuating means axially movable with respect to said shafts, means for moving said actuating means in one direction when said steering shaft is rotated clockwise and in the opposite direction when said steering shaft is rotated counter-clockwise, said last named means including a first set of spring struts each having one end operatively connected to one of said shafts and the other end operatively connected to said actuating means and a second set of spring struts each having one end operatively connected to the other of said shafts and the other end operatively connected to said actuating means, and power means responsive to movement of said actuating means for applying power to said steering means.

4. A power steering mechanism comprising steering means, a steering shaft, a driven shaft coaxial with said steering shaft and connected to said steering means, means between said steering shaft and said driven shaft for permitting limited relative rotary motion therebetween, a first member rigidly connected to the other of said shafts, a third member located between said first and second members and axially movable with respect to said shafts, means for moving said third member in one direction when said steering shaft is rotated clockwise and in the opposite direction when said steering shaft is rotated counterclockwise, said last named means including a first set of spring struts each having one end connected to said first member and the other end to said third member and a second set of spring struts each having one end connected to said second member and the other end to said third member, and power means responsive to movement of said second member for applying power to said steering means.

5. In a power steering mechanism having steering means, a hydraulic motor connected to said steering means, and valve means for controlling the operation of said hydraulic motor, a mechanism for actuating said valve means comprising a steering shaft, a driven shaft coaxial with said steering shaft and connected to said steering means, a first member rigidly connected to said steering shaft, a second member rigidly connected to said driven shaft, a movable third member connected to said valve means for actuation thereof, a first set of spring struts each having one end connected to said first member and the other end to said third member, said struts each forming an acute angle with respect to said first and third members, a second set of spring struts each having one end connected to said second member and the other end to said third member, said struts in said second set each forming an acute angle with respect to said second and third members, said third member being moved toward said first member by said struts upon rotation of said steering shaft in a direction tending to decrease the acute angles formed by said first set of struts and increase the acute angles formed by said second set of struts and moved away from said first member upon rotation of said steering shaft in a direction tending to increase the acute angles formed by said first set of struts and decrease the acute angles formed by said second set of struts.

6. In a power steering mechanism having steering means, a power cylinder connected to said steering means, and a valve for controlling the operation of said power cylinder, a valve actuating mechanism comprising a steering shaft and connected to said steering means, a first member rigidly connected to one of said shafts, a second member rigidly connected to the other of said shafts, a third member located between said first and second members and axially movable with respect to said shafts, two sets of spring struts for opposing rotation of said steering shaft and for moving said third member in one direction when said steering shaft is rotated clockwise and in the opposite direction when said steering shaft is rotated counterclockwise, each of said spring struts in one of said sets having one end rigidly connected to said first member and the other end rigidly connected to said third member and being angularly positioned to form predetermined acute angles with respect to said first and third members, and each of said spring struts in the other of said sets having one end rigidly connected to said second member and the other end rigidly connected to said third member and being angularly positioned to form predetermined acute angles with respect to said second and third members, said acute angles formed by each of set of struts being substantially equal.

References Cited in the file of this patent

UNITED STATES PATENTS

| | | |
|---|---|---|
| 2,334,347 | McMurtry | Nov. 16, 1943 |
| 2,362,930 | Robbins | Nov. 14, 1944 |
| 2,782,652 | Fletcher | Feb. 26, 1957 |